(12) United States Patent
Forster et al.

(10) Patent No.: US 6,469,627 B1
(45) Date of Patent: Oct. 22, 2002

(54) MOUNTING CLIP HAVING A WIRELESS COMMUNICATION DEVICE

(75) Inventors: Ian J. Forster; Michael G. Ginn, both of Essex (GB); Patrick F. King, Glen Ellyn, IL (US)

(73) Assignee: Marconi Communications Inc., Warrendale, PA (US)

( * ) Notice: Subject to any disclaimer, the term of this patent is extended or adjusted under 35 U.S.C. 154(b) by 0 days.

(21) Appl. No.: 09/502,850

(22) Filed: Feb. 11, 2000

(51) Int. Cl.⁷ .............................................. G08B 13/14
(52) U.S. Cl. .................... 340/572.8; 340/572; 340/540; 340/541; 340/542; 340/825.54; 340/825.72
(58) Field of Search ............................. 340/572, 572.8, 340/540, 541, 652, 542, 825.54, 825.72, 693.5, 693.7

(56) References Cited

U.S. PATENT DOCUMENTS

| | | |
|---|---|---|
| 3,787,993 A | 1/1974 | Lyon .......................... 40/306 |
| 4,630,044 A * | 12/1986 | Polzer .................... 340/825.72 |
| 4,744,162 A * | 5/1988 | Okazaki ..................... 40/312 |
| 4,862,160 A | 8/1989 | Ekchian et al. ........ 340/825.54 |
| 5,021,767 A * | 6/1991 | Fockens et al. ............. 340/572 |
| 5,326,939 A * | 7/1994 | Schafer ..................... 177/139 |
| 5,396,218 A * | 3/1995 | Olah ........................ 340/572 |
| 5,524,750 A * | 6/1996 | Miller ....................... 206/767 |
| 5,564,166 A * | 10/1996 | Roy ............................ 24/3.11 |
| 5,631,631 A * | 5/1997 | Deschenes ................. 340/572 |
| 5,648,765 A * | 7/1997 | Cresap et al. ........... 340/825.35 |
| 5,767,772 A | 6/1998 | Lemaire et al. ............. 340/571 |
| 5,779,839 A | 6/1998 | Tuttle et al. ................ 156/213 |
| 5,790,029 A * | 8/1998 | Curnutte et al. ............ 340/572 |
| 5,798,693 A | 8/1998 | Engellenner ................ 340/505 |
| 5,831,531 A * | 11/1998 | Tuttle ........................ 340/572 |
| 5,842,118 A * | 11/1998 | Wood, Jr. ............. 340/825.54 |
| 5,865,339 A | 2/1999 | Carlson ....................... 220/694 |
| 5,883,376 A | 3/1999 | Rosch et al. ................. 235/492 |
| 5,887,176 A | 5/1999 | Griffith et al. ............... 395/750 |
| 5,936,523 A | 8/1999 | West ........................ 340/545.6 |
| 5,953,682 A | 9/1999 | McCarrick et al. ........... 702/45 |
| 5,963,177 A * | 10/1999 | Tuttle et al. ................. 340/505 |
| 5,972,156 A | 10/1999 | Brady et al. ................. 156/280 |
| 5,986,569 A * | 11/1999 | Mish et al. ............ 340/825.54 |
| 6,023,244 A | 2/2000 | Snygg et al. ......... 343/700 MS |
| 6,031,459 A | 2/2000 | Lake ....................... 340/572.8 |

FOREIGN PATENT DOCUMENTS

| | | |
|---|---|---|
| DE | 44 46 203 A | 6/1996 |
| DE | 295 04 712 U | 7/1996 |
| DE | 197 03 819 C | 8/1998 |
| DE | 197 03 819 C1 | 8/1998 |
| FR | 2681972 A | 4/1993 |
| GB | 974 249 A | 11/1964 |
| GB | 2 092 096 A | 8/1982 |
| GB | 2 210 349 A | 6/1989 |
| GB | 2 293 588 A | 4/1996 |
| WO | WO 94/05090 | 3/1994 |
| WO | WO 95/15622 | 6/1995 |
| WO | WO 99/18000 | 4/1999 |

* cited by examiner

Primary Examiner—Jeffery Hofsass
Assistant Examiner—Hung Nguyen
(74) Attorney, Agent, or Firm—Withrow & Terranova PLLC

(57) ABSTRACT

The present invention is directed to an identification device that is resiliently deformable between a first shape and a second, smaller shape. The second shape allows for inserting the mounting clip into a container opening. The mounting clip resiliently biases from the second shape to the first, larger shape for maintaining the mounting clip attached to the container. A wireless communication device is mounted to the mounting clip for identifying attributes of the container. The identification device may communicate with an interrogation reader for transferring information regarding the container and contents to a central control system.

13 Claims, 7 Drawing Sheets

MOUNTING CLIP HAVING A WIRELESS COMMUNICATION DEVICE

BACKGROUND OF THE INVENTION

The present invention relates generally to a device for monitoring the location of a container and, more particularly, to a mounting clip with attached wireless communication device for attachment to a container for monitoring the location of the container.

BACKGROUND OF THE INVENTION

It is often necessary to monitor the location and movement of materials within a distribution center or manufacturing facility. One method of tracking the materials is to attach a wireless communication device such as a radio frequency identification (RFID) transponder or other identification device to containers that are housing the materials. By way of example, a liquid container such as a barrel or keg may include an identification device indicative of the liquid contained inside. An interrogation reader, or series of receivers, having an antenna device and able to send information remotely through electronic signals, is placed throughout the distribution or manufacturing facility to receive signals transmitted from the identification devices. The signals are then passed to a central control system that monitors and records the applicable information. The central control system can also send information to its interrogation readers to send to the transponders for response and/or to be stored in the transponder's memory.

The identification system also allows for statistical analysis of the materials to maintain an accurate inventory, production flow rates, and other production standards. Additionally, the identification devices may include specific information about the materials housed within the containers including date of manufacture, place of manufacture, type of product within the container, the temperature of the container and ambient air, the temperature of the contents of the container, the pressure of the container, etc.

A problem occurs when the containers are not conducive for mounting an identification device or transponder. One example is a beer keg that has a substantially cylindrical shape with smooth, uniform outer walls. There are no extensions or areas for effectively attaching the identification device. Additionally, these containers may be heavy and cumbersome to handle. During the filling process and distribution, the containers may bang against other containers, storage racks, conveyor equipment, etc. An identification device attached to the container may easily be damaged or destroyed during this process.

Another concern is that the identification devices should be able to be quickly mounted to the containers. Each container should be identified with a separate identification device. The labor cost would be excessive and outweigh the benefits of the identification system if each device was timely to mount to the containers. Therefore, it is important that the identification devices can be quickly attached to each of the individual devices. Inherent with the quick attachment, the devices should be mounted in a straight-forward manner that is not overly difficult to require specialized equipment, or highly-trained technicians during the attachment process.

In addition to be quickly attached, the identification tags should also securely attach to the containers. Secure attachment should prevent the tags from inadvertently falling off the containers, even during handling of the containers when they may be dropped, bounced around, and otherwise roughly handled.

It is also important that the identification tags be attached in an inconspicuous manner. For reusable containers that are sent to the consumers and then returned to be refilled and redistributed, an inconspicuous placement will help to ensure that the consumers do not tamper with or otherwise destroy the identification tag. An inconspicuous placement, such as within the enclosed rim of a keg, may also help to shield the identification tag from damage while being handled.

SUMMARY OF THE INVENTION

The present invention is directed to an identification device for attachment to a container to provide information and location information. The device may be attached to the container in a straight-forward manner, and allows for a secure attachment without requiring special equipment or trained personnel. In one embodiment, the device includes a mounting clip having a main section and an arm section that are resiliently connected together at an acute angle. The arm and main sections may be pinched together to extend through an opening in the container and then resiliently separate to hold the device. Another embodiment features a substantially "R-shaped" clip having two feet that may be pinched together and inserted into the container. Another embodiment includes a card-like mounting clip constructed of a deformable material. The clip is deformed and inserted into the container and then returns to the original orientation against a wall of the container. In each embodiment, a wireless communication device is attached to the clip for signaling the container information.

A method of identifying a container is also contained within the present invention. The method includes inserting the clip into a container opening and attaching it to the container. Attachment is accomplished by deforming the clip during the insertion through the container opening. Once through the opening, the clip returns to the original shape preventing the clip from being removed. The wireless communication device is preferably positioned on a section of the clip that extends outward from the container opening allowing for clear and effective transmitting of signals.

The invention may be used for tracking any number of tagged containers as they move throughout a distribution or manufacturing facility. The containers with identification devices may move past an interrogation reader which provides for transferring information. Any number of interrogation readers may be positioned along the container route for tracking the attributes of the container. Additionally, a central control system may be connected to the interrogation readers for overseeing the information, and additionally controlling communication with each container.

DETAILED DESCRIPTION OF THE PREFERRED EMBODIMENTS

Figure 1:
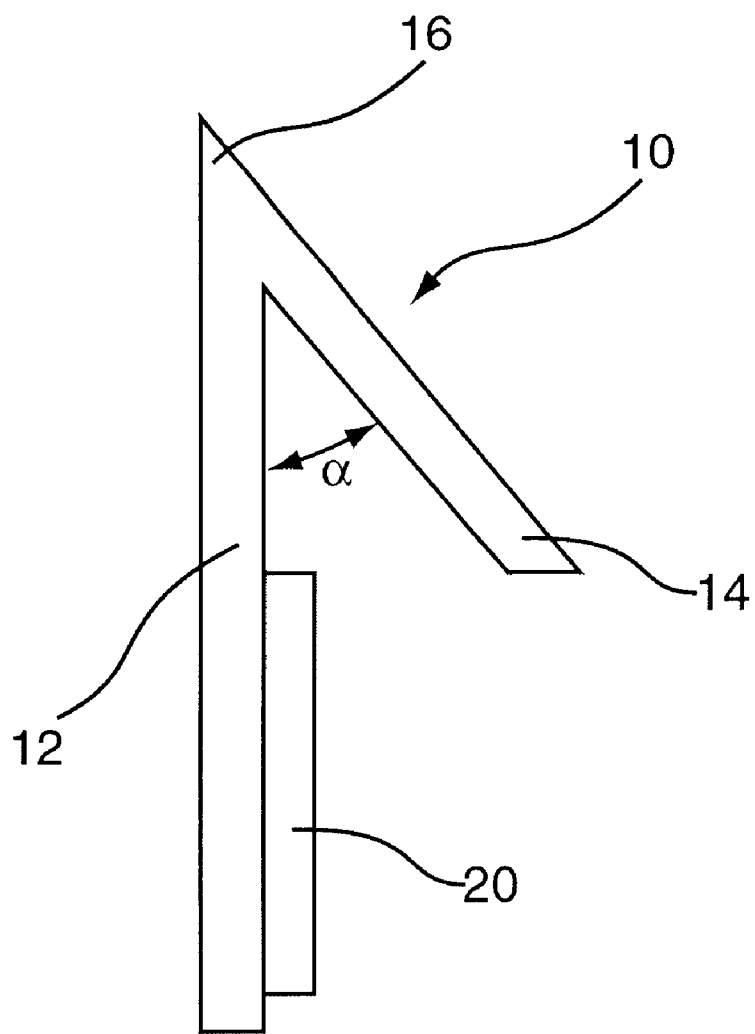
FIG. 1 is a side view of the mounting device with attached wireless communication device constructed according to the present invention.

Referring now to the drawings in general in FIG. 1 in particular, it will be understood that the illustrations are for the purpose of describing a preferred embodiment of the invention and are not intended to limit the invention thereto. As illustrated in FIG. 1, the mounting device of a first embodiment, generally designated 10, is shown constructed according to the present invention. The mounting device 10 includes a mounting clip having a base section 12 and an arm section 14 resiliently connected together at an acute angle α. An identification device 20 is mounted to the base section 12 for indicating the location and information of the container.

Figure 4A:
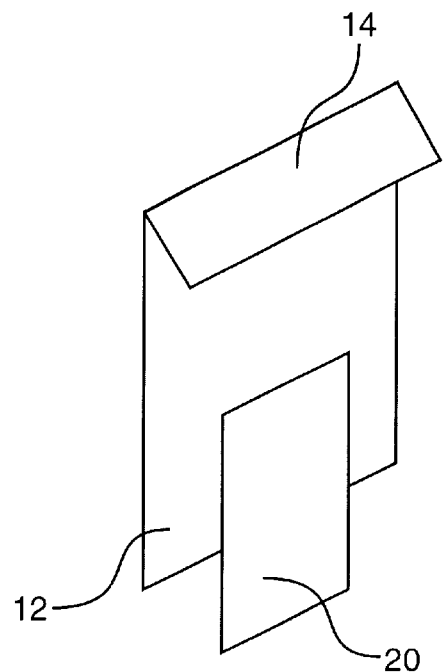
FIG. 4A is a perspective view of the mounting device with attached wireless communication device.

The base section 12 and arm section 14 connect at a first end of each section forming a joint 16. As illustrated in FIG. 4, the sections 12, 14 may be attached along a common edge forming the joint 16. Alternatively, the sections 12, 14 may attach at isolated sections of the joint 16 or other like design. The width of the sections 12, 14 may vary depending upon the specific embodiment and application.

The sections 12, 14 are connected together at an acute default angle of less than about 90 degrees relative to each other. When no outside forces are applied, the material of which the sections are constructed has memory and will return to about this default angle. The sections 12, 14 are resiliently connected allowing for the angle α to vary as force is applied. When no external forces are applied to the mounting device 10, the distance between the end of the arm section 14 opposite the joint 16 and normal to the base section, defined as the mounting clip distance, is greater than the distance of the opening through which the mounting device 10 is attached as will be explained below.

The angle α may vary between about zero and ninety degrees depending on the specific embodiment. During insertion through an opening in the container, the arm section 14 and base section 12 will be compressed together resulting in a smaller α. This allows for the arm section 14, joint 16, and upper portion of the base section 12 to be inserted within the opening. Once the force applied to the sections 12, 14 is removed, the sections separate and α is returned to about the default position. In one preferred embodiment, α ranges from between about 0 to 45 degrees.

Figure 4B:
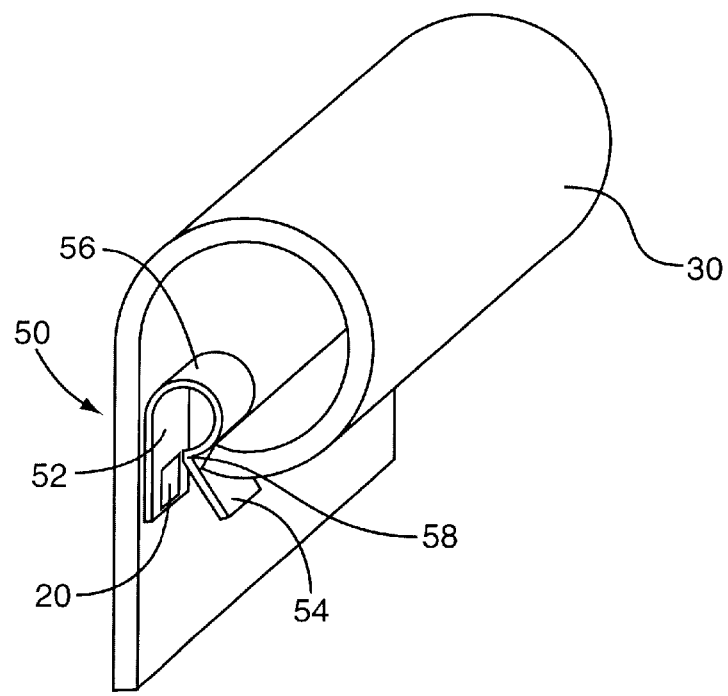
FIG. 4B is a perspective view illustrating another clip embodiment mounted within the container.

FIG. 4B illustrates another embodiment of the mounting device 50. The device 50 is substantially "R-shaped" having opposing feet 52, 54 and a substantially rounded upper section 56. An angled edge 58 positions the device 50 once installed within the container 30. Preferably, the wireless communication device 20 is mounted on one of the opposing feet 52, 54 placing it outward from the container when the device 50 is mounted. During installation, the feet 52, 54 are pinched together reducing the cross section of the rounded upper section 56 for insertion into the container. Once inserted, the feet 52, 54 are released, the cross section of the upper section 56 expands preventing the device 50 from being easily removed.

Figure 2:
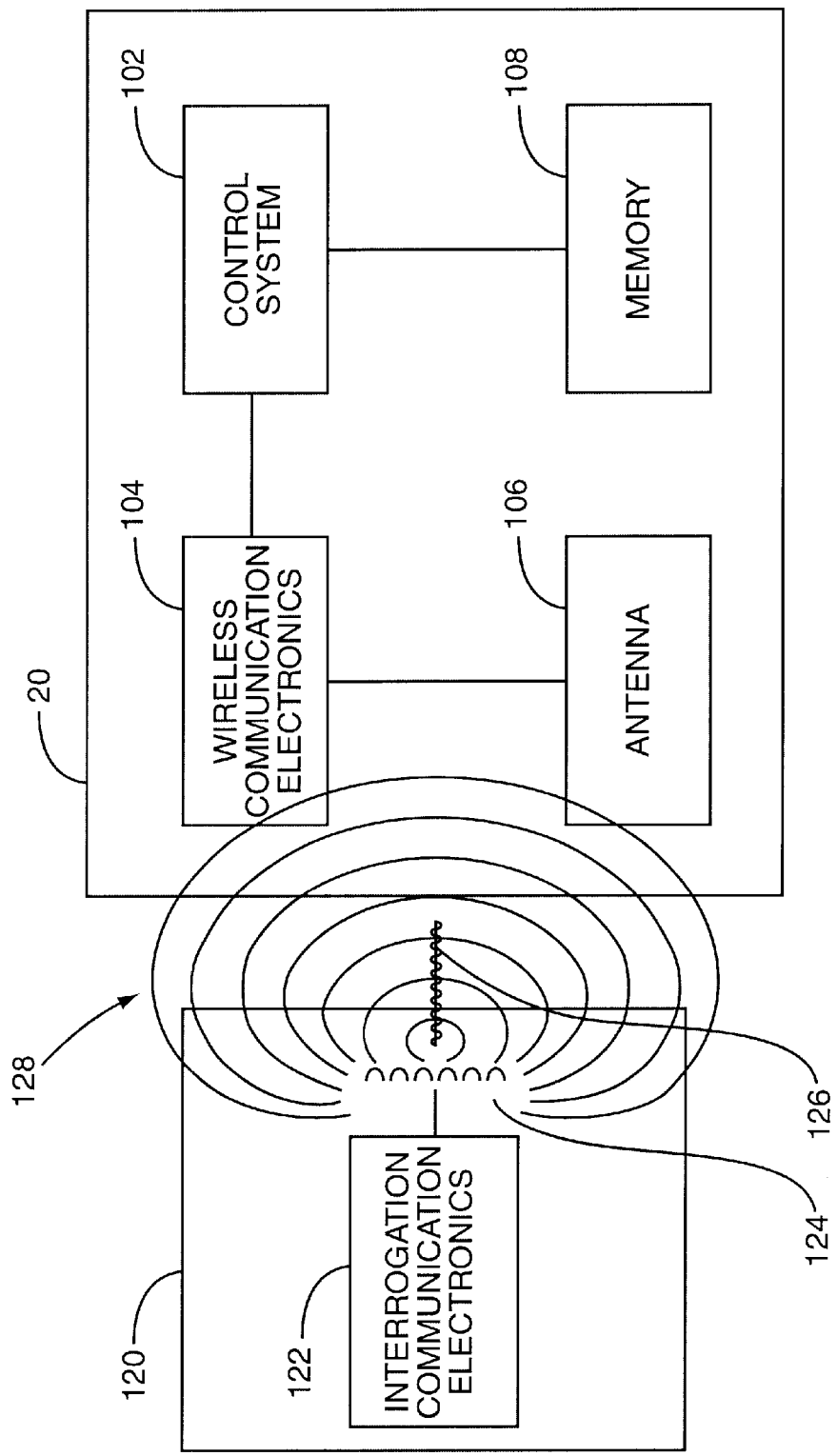
FIG. 2 is a schematic diagram illustrating the communication between the wireless communication device and an interrogation reader.

FIG. 2 illustrates one particular type of wireless communication device 20 called a radio frequency transponder. One of ordinary skill in the art will understand that there are many other different types of wireless identification devices 20 that allow electronic communication and the present invention is not limited to any one particular type. The transponder 20 is usually made out of some type of plastic or other material having within it control system 102, wireless communication electronics 104, antenna 106, and memory 108. The antenna 106 may be either external or incorporated internal to the transponder 20.

The control system 102 is an integrated circuit or other type of microprocessor or micro-controller electronics that controls the substantive operations of the transponder 20. The control system 102 is connected to the wireless communication electronics 104 to communicate and receive transmissions. The control system 102 is also connected to memory 108 for storing information and retrieving information.

FIG. 2 also depicts how communication is achieved with the transponder 20. An interrogation reader 120 contains interrogation communication electronics 122 and an interrogation antenna 124. The interrogation reader 120 communicates to the transponder 20 by emitting an electronic signal or command modulated in a frequency 126 through the interrogation antenna 124. The interrogation antenna 124 may be any type of antenna that can radiate the modulated signal 126 through a field 128 so that a compatible device such as a transponder 20 can receive such signal 126 through its own antenna 106. The field 128 could be any of a variety of different types used in electronic communications including electromagnetic, magnetic, or electric. The signal 126 is a message containing information and/or specific instructions for the transponder 20.

When the transponder antenna 106 is in the presence of the field 128 emitted by the interrogation reader antenna 124, the wireless communication electronics 104 are energized thereby energizing the transponder 20. The transponder 20 remains energized so long as its antenna 106 is in the field 128 of the interrogation reader 120. The wireless communication electronics 104 demodulate the signal 126 and send the message containing information and/or specific instructions to the control system 102 for appropriate actions. For example, the request in the message may be for the transponder 20 to send back information about the materials housed within the container 30 including date of manufacture, place of manufacture, and type of product within the container. The message may also be instructions to send back information regarding the temperature of the container, its ambient air, the temperature of the contents of the container, the pressure of the container, etc. The transponder 20 sends back information to the interrogation reader 120 by altering the contents of the signal 126.

Alternative forms exist for communicating with a wireless electronic device such as a transponder 20. For instance, the transponder 20 may have a transmitter so that it can send information to the interrogation reader without having to use the signal 126 as the means for communication. The transponder 20 may contain a battery to power the transmitter, or an energy storage unit that is charged by the energy when the transponder is in the field 128 of the signal 126. It is understood to one of ordinary skill in the art there are many other manners in which to communicate with a wireless identification device such as a transponder 20, and that the present invention is not limited to the particular manner described above.

Figure 3:
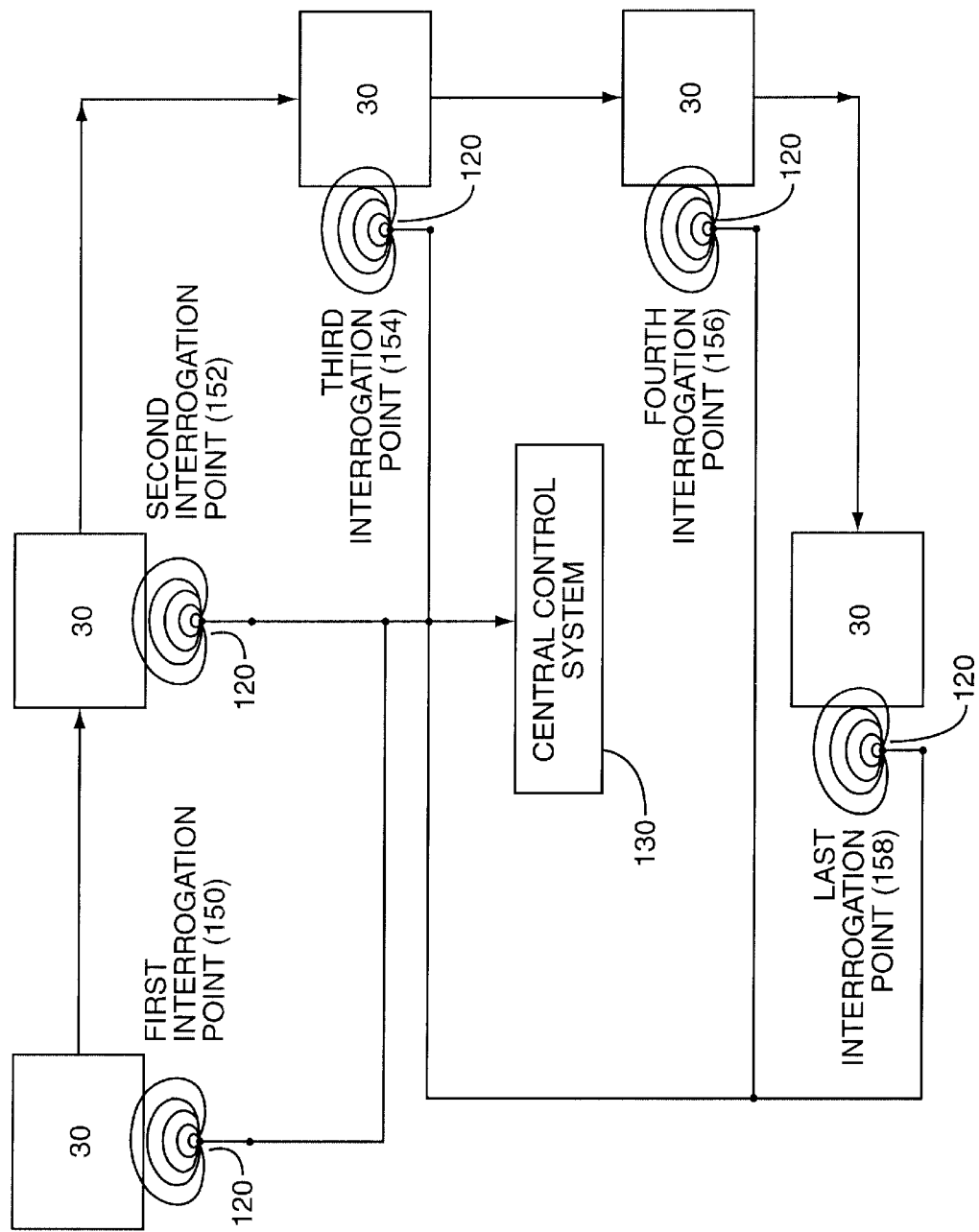
FIG. 3 is a schematic illustration of the tracking and information system for a wireless communication device.

FIG. 3 illustrates a tracking system in which containers 30 containing transponders 20 can be tracked through an environment such as factory or distribution facility. For example, the transponder 20 connected to container 30 could pass a first interrogation point 150 that includes an interrogation reader 120. When the container 30 and its transponder 20 is in the presence of the interrogation reader 120 as described previously, a message containing information and/or a specific request for information may be transmitted by the interrogation reader 120 and received by the transponder 20. This process continues as the container 30 moves to a second interrogation point 152, a third interrogation point 154, a fourth interrogation point 156, and on to a last interrogation point 158.

A central control system 130 maintains the information from the interrogation readers 120 and monitors the movement of the containers 30 through the facility. The information received by each of the interrogation readers 120 may be forwarded to the central control system 130 either through direct wire or LAN connection. The central control system 130 could also send information to the interrogation reader 120 to be transmitted to the transponder 20 for identification purposes. The central control system 130 track the expected location of the containers 30 and may be alerted if it expects to receive information about a particular container and does not.

During commissioning of each container 30, it may be necessary to place the container 30 containing the transponder 20 in range of an interrogation reader 120 in order to erase previously stored information in memory 108 or to store particular data or configuration information about the container 30 in memory 108 for later use. Preferably, a separate wireless communication device 20 is preferably mounted on each container 30.

Figure 5:
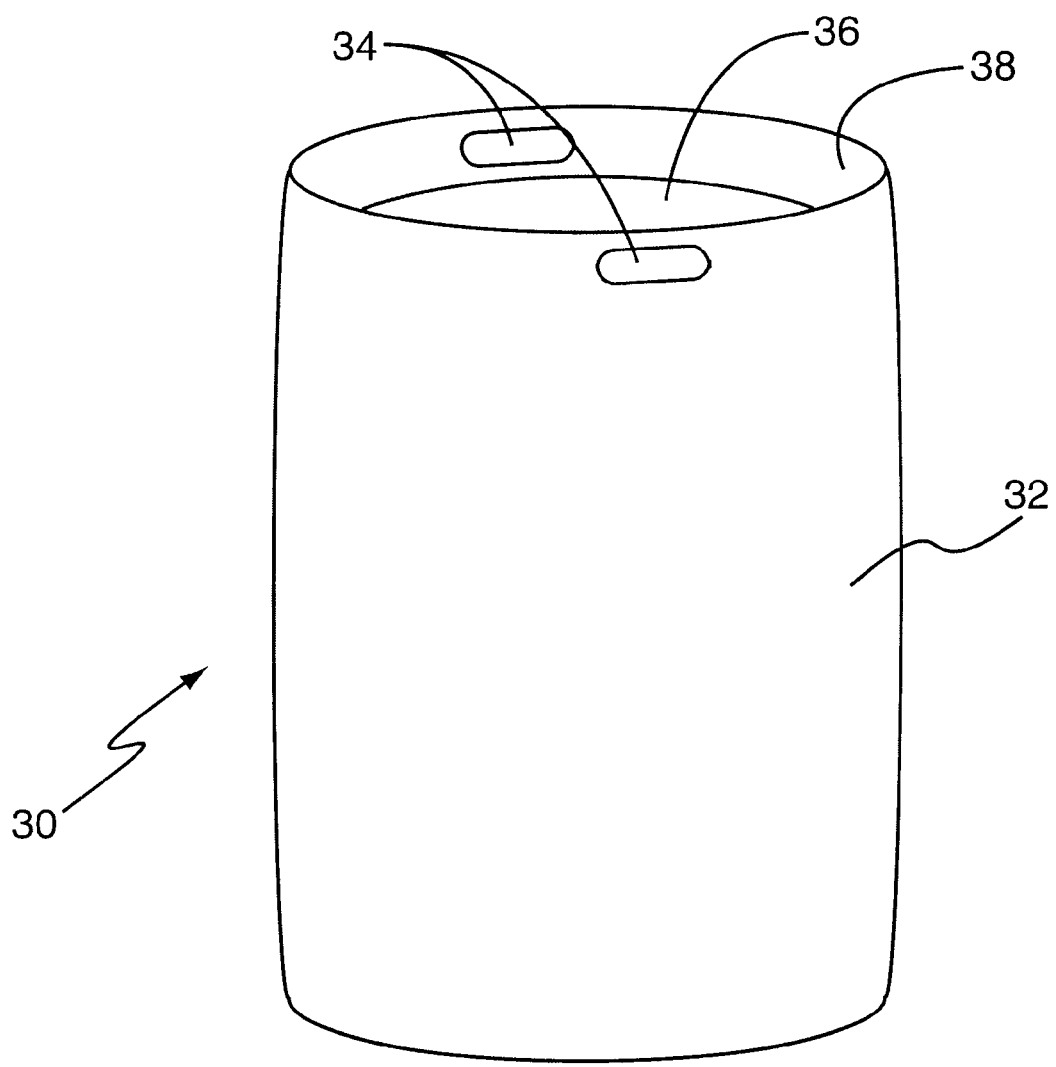
FIG. 5 is a perspective view of an embodiment of a container.

The container 30 may have a variety of shapes and sizes. FIG. 5 illustrates one embodiment of a container 30 having a main body 32 for holding materials. A rim 38 extends outward from the top surface 36 and includes handles 34 grasping and carrying the container. As illustrated in FIG. 5, the rim 38 may further include a lip 39 extending around the upper edge having an opening 40 formed between the rim 38 and lip 39. In one embodiment, the container 30 is a beer keg, although one skilled in the art will appreciate that the present invention is applicable to a wide variety of container shapes and sizes. Additionally, a wide variety of openings 40 may be available on a container 30 for attachment of the present invention such as a drain hole positioned within the rim 38 or lip 39 for draining any liquid which may become trapped within this area.

Figure 6A:
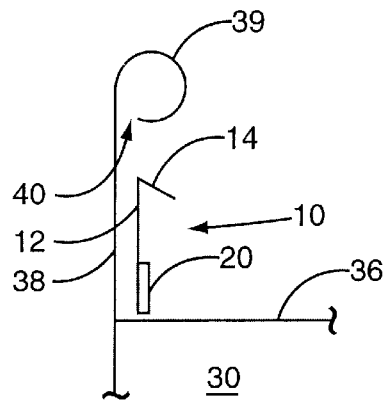
FIG. 6A is a partial sectional view of a first stage of the attachment process of the present invention.
Figure 6B:
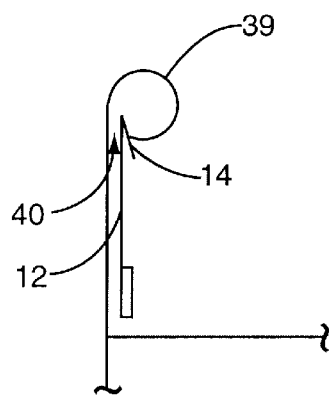
FIG. 6B is a partial sectional view of a second stage of the attachment process.
Figure 6C:
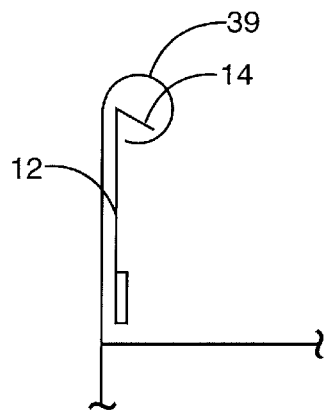
FIG. 6C is a partial sectional view of a third stage of the attachment process.

FIGS. 6A–6C illustrate the progression of attaching the first embodiment of the mounting device 10 to the container 30. The mounting device 10 is positioned adjacent to the opening 40. At this position, the arm section 14 is separated by the base section 12 at an angle α. The wireless communication device 20 is positioned on the base section 12, or may be attached to and extend from the base section as illustrated.

FIG. 6B illustrates the joint 16 inserted into the opening 40 such that the arm section 14 is forced towards the base section 12 thereby reducing the angle α to an extent up to and including zero degrees in which the two sections are in contact and parallel relation. This orientation allows for the mounting device 10 to be inserted into an opening as small as the combined width of the sections 12, 14.

The mounting device 10 is further inserted through the opening 40 as illustrated in FIG. 6C to an extent where the arm section 14 clears the edge of the rim 39. Once clear of the rim 39, the arm section 14 resiliently biases away from the base section 12 towards the initial default angle in which the mounting clip distance is greater than the width of the opening 40. If someone tries to remove the mounting device 10 from the container 30, the angle α of the arm section 14 relative to the base section 12 will prevent the device from exiting the opening. Preferably, the base section 12 with attached wireless communication device 20 is positioned adjacent to the rim 38 for protection and make the device as inconspicuous as possible. In one embodiment, the base section 12 and wireless communication device 20 have the same color as the container 30.

Figure 7A:
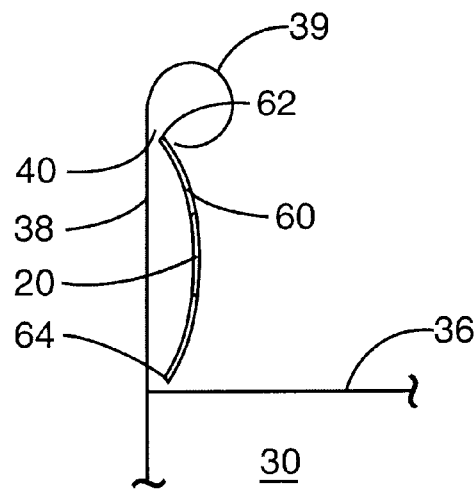
FIG. 7A is a side view of another clip embodiment that is deformed for positioned within the container opening.
Figure 7B:
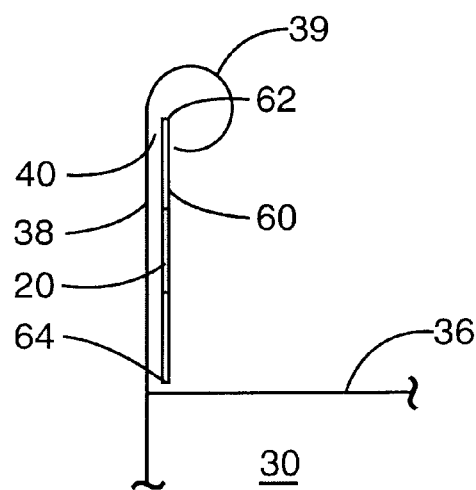
FIG. 7B is a side view illustrating the clip of FIG. 7A mounted to the container.

FIGS. 7A and 7B illustrate another embodiment of the mounting device. The device 60 is substantially planar member constructed of a deformable, resilient material. In one embodiment, the device 60 is substantially rectangular shaped. As illustrated in FIG. 7A, the device 60 is deformed during the installation such that the device has a smaller width so a first end 62 may be inserted into the opening 40 within the lip 39. FIG. 7B illustrates the device 60 returned to the original shape having a larger width with the first end 62 within the lip 39 and a second end 64 against the container top surface 36. Additionally, adhesive may be disposed on the side of the device for attaching it to the rim 38. The wireless communication device 20 may be mounted on the exterior of the device 60, or may be embedded within.

In the foregoing description, like-reference characters designate like or corresponding parts throughout the several views. Also, it is to be understood that such terms as "forward", "rearward", "left", "right", "upwardly", "downwardly", and the like are words of convenience that are not to be construed as limiting terms. Certain modifications and improvements will occur to those skilled in the art upon a reading of the foregoing description. By way of example, the wireless communication device 20 may be mounted to the surface of the mounting devices, or may be embedded within the devices. It should be understood that all such modifications and improvements have been deleted herein for the sake of conciseness and readability but are properly within the scope of the following claims.

What is claimed is:

1. An identification device comprising:
   a body member constructed of a resilient material and having a first shape with first dimensions, said body member being deformable from said first shape to a second shape and having at least one dimension smaller than said first shape;
   a wireless communication device attached to said body member; wherein said body member is substantially "R-shaped".

2. The device of claim 1, wherein said container is a beer keg.

3. An identification device comprising:
   a body member constructed of a resilient material and having a first shape with first dimensions, said body member being deformable from said first shape to a second shape and having at least one dimension smaller than said first shape;
   a wireless communication device attached to said body member; wherein said body member includes a main section and an arm section connected together at an acute angle.

4. The device of claim 3, wherein said container is a beer keg.

5. An identification system comprising:
- a container for holding a material, said container having an opening;
- a mounting clip having a body member constructed of a resilient material and having a first shape with first dimensions, said body member being deformable from said first shape to a second shape and having at least one dimension smaller than said first shape; and
- an identification device positioned on said mounting clip wherein said mounting clip includes an arm section, a base section, and a joint section at which said arm and base sections are connected at an acute angle, said arm section and said joint section both positioned on a first side of said opening and said base section extending through said opening to a second side of said opening.

6. The device of claim 5, wherein said arm is positioned within a range of between about 0–60 degrees relative to said base section.

7. The device of claim 5, wherein said wireless communication device is positioned on an exterior section of said container.

8. The device of claim 5, wherein said container is a beer keg.

9. An identification system comprising:
- a container for holding a material, said container having an opening;
- a mounting clip having a body member constructed of a resilient material and having a first shape with first dimensions, said body member being deformable from said first shape to a second shape and having at least one dimension smaller than said first shape; and
- an identification device positioned on said mounting clip wherein said mounting clip is substantially "R-shaped".

10. The device of claim 9, wherein said container is a beer keg.

11. A method of identifying a container through a mounting clip with an attached wireless communication device, the method comprising the steps of:
- reducing the size of the mounting clip by deforming it from a first shape to a second shape;
- inserting the mounting clip into the container; and returning the mounting clip to the first shape wherein the mounting clip includes an arm section and a base section connected together forming an acute angled end, the method further comprising the step of:
- inserting the angled end of the mounting clip into a container opening and forcing the arm section to flex towards the base section; and
- inserting the mounting clip into the opening an additional distance such that the arm section passes the opening and resiliently flexes away from the base section.

12. The method of claim 11, wherein the arm section returns to the first angle relative to the base section upon complete insertion into the opening.

13. The device of claim 11, wherein said container is a beer keg.

* * * * *